(12) United States Patent
Wang et al.

(10) Patent No.: US 11,397,347 B2
(45) Date of Patent: Jul. 26, 2022

(54) COLOR FILTER SUBSTRATE, MANUFACTURING METHOD THEREOF, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Lin Wang, Beijing (CN); Yongzhi Song, Beijing (CN); Ruirui Wang, Beijing (CN); Huabin Chen, Beijing (CN); Xingliang Li, Beijing (CN); Yang Liu, Beijing (CN); Yingqiang Gao, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 498 days.

(21) Appl. No.: 16/452,792

(22) Filed: Jun. 26, 2019

(65) Prior Publication Data

US 2020/0033671 A1    Jan. 30, 2020

(30) Foreign Application Priority Data

Jul. 24, 2018   (CN) .......................... 201810819594.7

(51) Int. Cl.
*G02F 1/1335*   (2006.01)
*G02B 1/00*   (2006.01)
(Continued)

(52) U.S. Cl.
CPC ....... *G02F 1/133516* (2013.01); *G02B 1/005* (2013.01); *G02B 5/201* (2013.01); *G02B 5/26* (2013.01); *G02F 2202/32* (2013.01)

(58) Field of Classification Search
CPC ......... G02F 2203/055; G02F 1/133516; G02F 2202/32; G02F 1/133617; G02B 1/005;
(Continued)

(56) References Cited

U.S. PATENT DOCUMENTS 9,927,651 B2    3/2018 Hu
10,529,290 B1 *  1/2020 Parsons ............. G02F 1/133514
(Continued)

FOREIGN PATENT DOCUMENTS

CN          103235356        8/2013
CN          103472516       12/2013
(Continued)

OTHER PUBLICATIONS

Chinese Office Action dated Jul. 10, 2020 corresponding to Chinese Patent Application No. 201810819594.7; 18 pages.

*Primary Examiner* — Michael H Caley
*Assistant Examiner* — Jonathan Y Jung
(74) *Attorney, Agent, or Firm* — Leason Ellis LLP

(57) ABSTRACT

A color filter substrate, a manufacturing method thereof and a display device are disclosed. The color filter substrate includes a base substrate and a plurality of filter units located on the base substrate. Each filter unit includes a photonic crystal layer configured to transmit light of one color, and includes a first photonic crystal sub-layer and a second photonic crystal sub-layer that are stacked in a direction perpendicular to the base substrate.

20 Claims, 5 Drawing Sheets

(51) Int. Cl.
   *G02B 5/20*   (2006.01)
   *G02B 5/26*   (2006.01)
(58) Field of Classification Search
   CPC . G02B 5/26; G02B 5/201; G02B 5/20; B82Y 20/00
   See application file for complete search history.

(56) References Cited

U.S. PATENT DOCUMENTS

| | | | | |
|---|---|---|---|---|
| 2002/0045030 A1* | 4/2002 | Ozin | ................ | B82Y 40/00 |
| | | | | 428/173 |
| 2003/0008771 A1* | 1/2003 | Fu | ................ | C09K 9/00 |
| | | | | 502/402 |
| 2004/0070824 A1* | 4/2004 | Toda | ................ | G03B 21/567 |
| | | | | 359/452 |
| 2004/0227874 A1* | 11/2004 | Kim | ................ | G02F 1/133514 |
| | | | | 349/106 |
| 2009/0225805 A1 | 9/2009 | Nagatomo | | |
| 2009/0284696 A1* | 11/2009 | Cheong | ................ | G02B 1/005 |
| | | | | 977/902 |
| 2010/0101637 A1* | 4/2010 | Yamasaki | ................ | B82Y 30/00 |
| | | | | 252/514 |
| 2011/0108779 A1 | 5/2011 | Han et al. | | |
| 2011/0235161 A1* | 9/2011 | Joo | ................ | G02F 1/1685 |
| | | | | 359/296 |
| 2016/0170091 A1* | 6/2016 | Li | ................ | C30B 29/46 |
| | | | | 252/586 |
| 2017/0168204 A1* | 6/2017 | Zhang | ................ | G02F 1/133617 |
| 2019/0391448 A1* | 12/2019 | Thothadri | ................ | G02F 1/133603 |

FOREIGN PATENT DOCUMENTS

| | | |
|---|---|---|
| CN | 105005107 | 10/2015 |
| CN | 105353556 A | 2/2016 |
| CN | 106681046 A | 5/2017 |
| CN | 106773279 | 5/2017 |
| CN | 107037630 | 8/2017 |
| CN | 107065293 | 8/2017 |
| CN | 107589594 | 1/2018 |
| CN | 107870481 | 4/2018 |
| CN | 107957640 | 4/2018 |
| CN | 107976835 | 5/2018 |

* cited by examiner

COLOR FILTER SUBSTRATE, MANUFACTURING METHOD THEREOF, AND DISPLAY DEVICE

CROSS REFERENCE TO RELATED APPLICATIONS

The present application claims priority to the Chinese patent application No. 201810819594.7 filed on Jul. 24, 2018, the entire disclosure of which is incorporated herein by reference as part of the present application.

TECHNICAL FIELD

At least one embodiment of the present disclosure relates to a color filter substrate, a manufacturing method thereof, and a display device.

BACKGROUND

A quantum dot is a nanoscale semiconductor crystal capable of emitting light, and a size of a particle thereof is generally between 1-10 nm, which is equivalent to 10-50 atoms. When a quantum dot is excited by light, the quantum dot emits bright visible light with a spectral pure color.

Photonic Crystals (PC) are a kind of artificial periodic dielectric structure, which may be periodically arranged by medias with different refractive indexes. A Photonic Band Gap (PBG, similar to a forbidden band in a semiconductor) can be generated when materials with high and low refractive indexes are alternately arranged to form a periodic structure. Due to an existence of the photonic band gap, a light wave with a frequency falling within a range of the photonic band gap cannot propagate in the photonic crystal, so that the photonic crystal can selectively reflect a light wave with a specific frequency, while light with a frequency outside the range of the photonic band gap can propagate in the photonic crystal. That is, a photonic crystal is a periodic dielectric material with wavelength selection function, which can selectively allow light of a certain wavelength band to pass therethrough while preventing light of other wavelengths from passing therethrough.

SUMMARY

At least one embodiment of the present disclosure relates to a color filter substrate, a manufacturing method thereof, and a display device.

At least one embodiment of the present disclosure provides a color filter substrate, including: a base substrate, and a plurality of filter units located on the base substrate, each of the plurality of filter units including a photonic crystal layer configured to transmit light of one color and including a first photonic crystal sub-layer and a second photonic crystal sub-layer that are stacked in a direction perpendicular to the base substrate.

In some embodiments, a photonic band gap of the first photonic crystal sub-layer is different from that of the second photonic crystal sub-layer.

In some embodiments, the photonic crystal layer is consisted of the first photonic crystal sub-layer and the second photonic crystal sub-layer.

In some embodiments, the plurality of filter units include a first filter unit, a second filter unit, and a third filter unit, the photonic crystal layer of the first filter unit is configured to transmit light of a first color, the photonic crystal layer of the second filter unit is configured to transmit light of a second color, and the photonic crystal layer of the third filter unit is configured to transmit light of a third color; the first photonic crystal sub-layer and the second photonic crystal sub-layer of the first filter unit are a photonic crystal sub-layer with a photonic band gap at a wavelength band of the light of the third color and a photonic crystal sub-layer with a photonic band gap at a wavelength band of the light of the second color, respectively; the first photonic crystal sub-layer and the second photonic crystal sub-layer of the second filter unit are a photonic crystal sub-layer with a photonic band gap at the wavelength band of the light of the third color and a photonic crystal sub-layer with a photonic band gap at a wavelength band of the light of the first color, respectively; and the first photonic crystal sub-layer and the second photonic crystal sub-layer of the third filter unit are a photonic crystal sub-layer with the photonic band gap at the wavelength band of the light of the first color and the photonic band gap at the wavelength band of the light of the second color, respectively.

In some embodiments, the light of the first color, the light of the second color, and the light of the third color constitute three primary colors.

In some embodiments, two of the first photonic crystal sub-layer of the first filter unit, the first photonic crystal sub-layer of the second filter unit, and the first photonic crystal sub-layer of the third filter unit are configured to reflect light of a same color; and the first photonic crystal sub-layer of the first filter unit, the first photonic crystal sub-layer of the second filter unit, and the first photonic crystal sub-layer of the third filter unit are located at a same layer; two of the second photonic crystal sub-layer of the first filter unit, the second photonic crystal sub-layer of the second filter unit, and the second photonic crystal sub-layer of the third filter unit are configured to reflect light of a same color; and the second photonic crystal sub-layer of the first filter unit, the second photonic crystal sub-layer of the second filter unit, and the second photonic crystal sub-layer of the third filter unit are located at a same layer.

In some embodiments, two first photonic crystal sub-layers of adjacent filter units with different photonic band gaps have first side surfaces opposite to each other, each of the first side surfaces has a sawtooth structure, and the two first photonic crystal sub-layers of the adjacent filter units are meshed with each other through the first side surfaces; two second photonic crystal sub-layers of adjacent filter units with different photonic band gaps have second side surfaces opposite to each other, each of the second side surfaces has a sawtooth structure, and the two second photonic crystal sub-layers of the adjacent filter units are meshed with each other through the second side surfaces.

In some embodiments, the photonic crystal sub-layer with the photonic band gap at the wavelength band of the light of the first color, the photonic crystal sub-layer with the photonic band gap at the wavelength band of the light of the second color, and the photonic crystal sub-layer with the photonic band gap at the wavelength band of the light of the third color are overlapped with each other at an intersection of adjacent filter units.

In some embodiments, at least one selected from the group consisting of the first filter unit, the second filter unit, and the third filter unit further includes a quantum dot photoluminescence layer located on the photonic crystal layer, the quantum dot photoluminescence layer is configured to be excited to generate light of the same color as light transmitted by the photonic crystal layer located in a region where the quantum dot photoluminescence layer is located.

In some embodiments, a color of one selected from the group consisting of the light of the first color, the light of the second color, and the light of the third color is the same as a color of irradiation light irradiated to the color filter substrate.

In some embodiments, a photonic crystal in the first photonic crystal sub-layer and a photonic crystal in the second photonic crystal sub-layer include a nanosphere photonic crystal, and a refractive index of the nanosphere photonic crystal is greater than 2.

In some embodiments, a thickness of at least one of the first photonic crystal sub-layer and the second photonic crystal sub-layer is in a range from 400 nm to 80 μm.

At least one embodiment of the present disclosure provides a display device including any one of the color filter substrates as described above.

At least one embodiment of the present disclosure provides a manufacturing method of a color filter substrate, including: forming a first photonic crystal sub-layer and a second photonic crystal sub-layer on a base substrate; the first photonic crystal sub-layer and the second photonic crystal sub-layer are arranged in a stacked manner and constitute a photonic crystal layer configured to transmit light of one color.

In some embodiments, at least one of the first photonic crystal sub-layer and the second photonic crystal sub-layer is formed by an inkjet printing process, the inkjet printing process includes: forming a photonic crystal dispersion liquid, forming a pattern of photonic crystal dispersion liquid by inkjet printing using the photonic crystal dispersion liquid, and performing a heat treatment on the pattern of photonic crystal dispersion liquid to remove a substance to be removed to form the first photonic crystal sub-layer or the second photonic crystal sub-layer.

In some embodiments, a temperature of the heat treatment is 100-120° C., and a heating time of the heat treatment is 20-30 s.

In some embodiments, the manufacturing method further includes forming a plurality of filter units, each of the plurality of filter units including the photonic crystal layer, the plurality of filter units including a first filter unit, a second filter unit, and a third filter unit, wherein forming the photonic crystal layer of the first filter unit, the photonic crystal layer of the second filter unit, and the photonic crystal layer of the third filter unit includes: forming a first layer of photonic crystal; and forming a second layer of photonic crystal; forming the first layer of photonic crystal includes: forming a pattern of first photonic crystal dispersion liquid in the first filter unit and the second filter unit by inkjet printing using a first photonic crystal dispersion liquid, forming a pattern of second photonic crystal dispersion liquid in the third filter unit by inkjet printing using a second photonic crystal dispersion liquid, and performing a heat treatment to remove a substance to be removed including a solvent to obtain the first layer of photonic crystal; and forming the second layer of photonic crystal includes: forming a pattern of third photonic crystal dispersion liquid in the first filter unit and the third filter unit by inkjet printing using a third photonic crystal dispersion liquid; forming a pattern of second photonic crystal dispersion liquid in the second filter unit by inkjet printing using the second photonic crystal dispersion liquid, and performing a heat treatment to remove a substance to be removed including a solvent to obtain the second layer of photonic crystal.

In some embodiments, In some embodiments, the manufacturing method further includes forming a plurality of filter units, each of the plurality of filter units including the photonic crystal layer, the plurality of filter units including a first filter unit, a second filter unit, and a third filter unit, wherein forming the photonic crystal layer of the first filter unit, the photonic crystal layer of the second filter unit, and the photonic crystal layer of the third filter unit includes: forming a first layer of photonic crystal; and forming a second layer of photonic crystal; forming the first layer of photonic crystal includes: forming a pattern of first photonic crystal dispersion liquid in the first filter unit and the second filter unit by inkjet printing using a first photonic crystal dispersion liquid, and performing a heat treatment to remove a substance to be removed including a solvent; and then forming a pattern of second photonic crystal dispersion liquid in the third filter unit by inkjet printing using a second photonic crystal dispersion liquid, and performing a heat treatment to remove a substance to be removed including a solvent to obtain the first layer of photonic crystal; and forming the second layer of photonic crystal includes: forming a pattern of third photonic crystal dispersion liquid in the first filter unit and the third filter unit by inkjet printing using a third photonic crystal dispersion liquid, and performing a heat treatment to remove a substance to be removed including a solvent; and then forming a pattern of second photonic crystal dispersion liquid in the second filter unit by inkjet printing using the second photonic crystal dispersion liquid, and performing a heat treatment to remove a substance to be removed including a solvent to obtain the second layer of photonic crystal.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure without constituting any limitation thereto.

DETAILED DESCRIPTION

The technical solutions in the embodiments of the present disclosure will be clearly and completely described below in connection with the accompanying drawings in the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

Figure 1A:
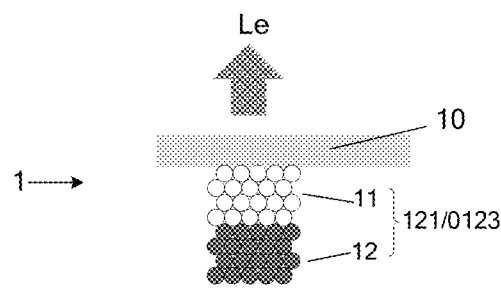
FIG. 1A is a cross-sectional view illustrating a color filter substrate provided by an embodiment of the present disclosure.

FIG. 1A is a cross-sectional view illustrating a color filter substrate provided by an embodiment of the present disclosure. As illustrated in FIG. 1A, the color filter substrate 1 includes a base substrate 10 and a plurality of filter units 0123 located on the base substrate 10. Only one filter unit 0123 is illustrated in FIG. 1A, and a plurality of filter units 0123 can be seen in FIG. 1B and FIG. 1C. As illustrated in FIG. 1A, each filter unit 0123 includes a photonic crystal layer 121. The photonic crystal layer 121 is configured to transmit light of one color. The photonic crystal layer 121 includes a first photonic crystal sub-layer 11 and a second photonic crystal sub-layer 12 that are stacked in a direction perpendicular to the base substrate 10. As illustrated in FIG. 1A, after an irradiation light 21 passes through the photonic crystal layer 121, transmitted light Le is a monochromatic light. For example, the base substrate 10 adopts a transparent glass substrate, without limited thereto.

According to the color filter substrate provided by at least one embodiment of the present disclosure, a first photonic crystal sub-layer and a second photonic crystal sub-layer are stacked on the base substrate to form a photonic crystal layer, the photonic crystal layer is served as an optical channel, can selectively propagate a light wave of a specific frequency, can be configured to transmit light of one color, and can modulate light to realize a filtering effect. Photonic crystal can significantly improve a transmittance of a color filter substrate due to extremely weak absorption of a light wave propagating in the optical channel. Moreover, the color filter substrate has a simple structure and is easy to be manufactured.

For example, a photonic band gap of the first photonic crystal sub-layer 11 is different from that of the second photonic crystal sub-layer 12 to reflect light of different colors.

As illustrated in FIG. 1A, in some embodiments, the photonic crystal layer 121 is consisted of the first photonic crystal sub-layer 11 and the second photonic crystal sub-layer 12 that are stacked in a direction perpendicular to the base substrate 10. Therefore, the color filter substrate has a simple structure and is easy to be manufactured.

For example, the photonic crystal layer 121 is configured to transmit light of a primary color. For example, a primary color refers to a basic color that cannot be obtained by blending other colors. Light of various colors can be obtained through primary colors of several different colors. The color filter substrate provided by this embodiment realizes a construction of photonic crystal color filter layer.

As illustrated in FIG. 1A, in the color filter substrates 1 provided by some embodiments, a color of light reflected by the first photonic crystal sub-layer 11 is different from a color of light reflected by the second photonic crystal sub-layer 12. Thus, the photonic crystal layer 121 formed by stacking the first photonic crystal sub-layer 11 and the second photonic crystal sub-layer 12 can be configured to transmit light of a color different from the colors reflected by the first photonic crystal sub-layer 11 and the color reflected by the second photonic crystal sub-layer 12. For example, a color of light reflected by the first photonic crystal sub-layer 11 and a color of light reflected by the second photonic crystal sub-layer 12 are different from the color of light transmitted by the photonic crystal layer 121. Because the photonic crystal material has a reflectivity of nearly 100% for light at a wavelength band of the photonic band gap, except the light transmitted by the photonic crystal layer 121, other stray light cannot pass through the photonic crystal layer 121, thus, a purity of transmitted light can be significantly improved.

Figure 1B:
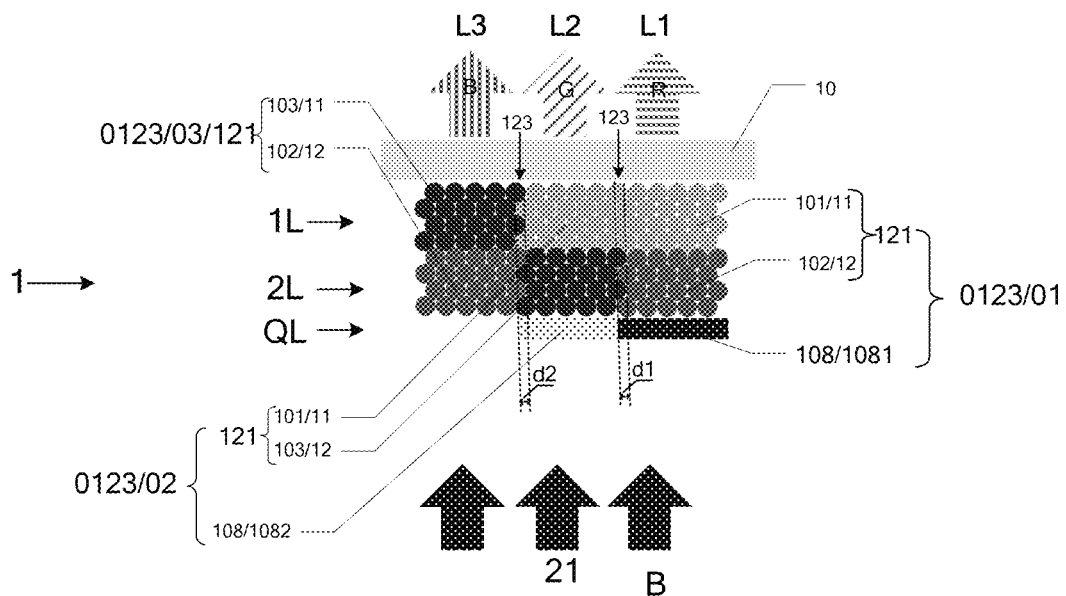
FIG. 1B is a cross-sectional view illustrating a color filter substrate provided by another embodiment of the present disclosure.

FIG. 1B is a cross-sectional view illustrating a color filter substrate provided by an embodiment of the present disclosure. As illustrated in FIG. 1B, in the color filter substrates 1 provided by some embodiments, the base substrate 10 includes a plurality of filter units 0123, each filter unit 0123 is provided with a photonic crystal layer 121. The plurality of filter units 0123 include a first filter unit 01, a second filter unit 02, and a third filter unit 03. One filter unit may correspond to one sub-pixel. The first filter unit 01, the second filter unit 02, and the third filter unit 03 may transmit light of different colors, respectively. The first filter unit 01, the second filter unit 02, and the third filter unit 03 may correspond to one pixel PL (the pixel PL may also refer to FIG. 3), without limited thereto. The first filter unit 01, the second filter unit 02 and the third filter unit 03 are provided with one photonic crystal layer 121, respectively.

For example, the first photonic crystal sub-layer 11 is configured to reflect light L3 of a third color and transmit light other than the light L3 of the third color, and the second photonic crystal sub-layer 12 is configured to reflect light L2 of a second color and transmit light other than the light L2 of the second color. The second photonic crystal sub-layer 12 is configured to transmit the light L1 of the first color and the light L3 of the third color and reflect the light L2 of the second color. The first photonic crystal sub-layer 11 is configured to transmit the light L1 of the first color and the light L2 of the second color and reflect the light L3 of the third color. In the case where the first photonic crystal sub-layer 11 and the second photonic crystal sub-layer 12 are arranged in a stacked manner, only the light L1 of the first color is transmitted. For example, the photonic crystal layer 121 of the first filter unit 01 is a channel of the light L1 of the first color, configured to transmit the light L1 of the first color, while light of other colors such as the light L2 of the second color and the light L3 of the third color cannot be transmitted. For example, the first photonic crystal sub-layer 11 is configured to transmit light of at least two colors, and the second photonic crystal sub-layer 12 is configured to transmit light of at least two colors.

As illustrated in FIG. 1B, in the color filter substrates 1 provided by some embodiments, the photonic crystal layer 121 of the first filter unit 01 is configured to transmit the light L1 of the first color, the photonic crystal layer 121 of the second filter unit 02 is configured to transmit the light L2 of the second color, and the photonic crystal layer 121 of the third filter unit 03 is configured to transmit the light L3 of the third color. For example, the first photonic crystal sub-layer 11 and the second photonic crystal sub-layer 12 of the first filter unit 01 are a photonic crystal sub-layer 1011 with a photonic band gap at a wavelength band of the light of the third color and a photonic crystal sub-layer 1021 with a photonic band gap at a wavelength band of the light of the second color, respectively. The first photonic crystal sub-layer 11 and the second photonic crystal sub-layer 12 of the second filter unit 02 are a photonic crystal sub-layer 1012 with the photonic band gap at the wavelength band of the light of the third color and a photonic crystal sub-layer 1032 with a photonic band gap at a wavelength band of the light of the first color, respectively. The first photonic crystal sub-layer 11 and the second photonic crystal sub-layer 12 of the third filter unit 03 are a photonic crystal sub-layer 1033 with the photonic band gap at the wavelength band of the light of the first color and a photonic crystal sub-layer 1023 with the photonic band gap at the wavelength band of the light of the second color, respectively. In the case where the light of three primary colors are red, green and blue, by way of example, the photonic crystal layer 121 of the first filter unit 01 is a red channel configured to transmit red light, the photonic crystal layer 121 of the second filter unit 02 is a green channel configured to transmit green light, and the photonic crystal layer 121 of the third filter unit 03 is a blue channel configured to transmit blue light.

For example, the light L1 of the first color, the light L2 of the second color, and the light L3 of the third color are light of different wavelengths, respectively. For example, a wavelength of the light L1 of the first color is greater than a wavelength of the light L2 of the second color, and a wavelength of the light L2 of the second color is greater than a wavelength of the light L3 of the third color. For further example, the light L1 of the first color is red light, the light L2 of the second color is green light, and the light L3 of the third color is blue light. The embodiment of the present disclosure is described with reference to the case where the light L1 of the first color is red light, the light L2 of the second color is green light, and the light L3 of the third color is blue light, by way of example.

For example, the photonic crystal layer 121 is configured to transmit one selected from the group consisting of the light L1 of the first color, the light L2 of the second color, and the light L3 of the third color. For example, the photonic crystal layer 121 is configured to reflect two selected from the group consisting of the light L1 of the first color, the light L2 of the second color, and the light L3 of the third color that are different from the light transmitted by the photonic crystal layer 121. The first photonic crystal sub-layer 11 is configured to reflect one of the two selected from the group consisting of the light L1 of the first color, the light L2 of the second color, and the light L3 of the third color that are different from the light transmitted by the photonic crystal layer 121, and the second photonic crystal sub-layer 12 is configured to reflect the other of the two selected from the group consisting of the light L1 of the first color, the light L2 of the second color, and the light L3 of the third color that are different from the light transmitted by the photonic crystal layer 121.

As illustrated in FIG. 1B, in some embodiments, the color filter substrate 1 is irradiated with irradiation light 21, and a color of the irradiation light 21 may be the same as a color of the light with the shortest wavelength among the light L1 of the first color, the light L2 of the second color, and the light L3 of the third color. The irradiation light 21 may be provided by a light source. For example, the color of the irradiation light 21 may be the same as the color of the light L3 of the third color. For example, the irradiation light 21 may be blue light. For example, in some embodiments, the irradiation light 21 adopts a blue electroluminescent light source. It should be noted that the irradiation light 21 is not limited to blue light, and may be white light or light with a shorter wavelength than the light L1 of the first color, the light L2 of the second color, and the light L3 of the third color, for example.

As illustrated in FIG. 1B, in the color filter substrates 1 provided by some embodiments, one of the first photonic crystal sub-layer 11 and the second photonic crystal sub-layer 12 of the first filter unit 01 is configured to reflect the light L2 of the second color and transmit the light L3 of the third color, and the other of the first photonic crystal sub-layer 11 and the second photonic crystal sub-layer 12 of the first filter unit 01 is configured to transmit the light L2 of the second color and reflect the light L3 of the third color. One of the first photonic crystal sub-layer 11 and the second photonic crystal sub-layer 12 of the second filter unit 02 is configured to reflect the light L1 of the first color and transmit the light L3 of the third color, and the other of the first photonic crystal sub-layer 11 and the second photonic crystal sub-layer 12 of the second filter unit 02 is configured to transmit the light L1 of the first color and reflect the light L3 of the third color. One of the first photonic crystal sub-layer 11 and the second photonic crystal sub-layer 12 of the third filter unit 03 is configured to reflect the light L1 of the first color and transmit the light L2 of the second color, and the other of the first photonic crystal sub-layer 11 and the second photonic crystal sub-layer 12 of the third filter unit 03 is configured to transmit the light L1 of the first color and reflect the light L2 of the second color.

As illustrated in FIG. 1B, in some embodiments, the first photonic crystal sub-layer 11 of the first filter unit 01 is a photonic crystal sub-layer 1011 with a photonic band gap at a wavelength band of the light of the third color, includes photonic crystals 101 with a photonic band gap at a wavelength band of blue light; the second photonic crystal sub-layer 12 of the first filter unit 01 is a photonic crystal sub-layer 1021 with a photonic band gap at a wavelength band of the light of the second color, and includes photonic crystals 102 with a photonic band gap at a wavelength band of green light, so that the photonic crystal layer 121 of the first filter unit 01 is configured to transmit red light. The first photonic crystal sub-layer 11 of the second filter unit 02 is a photonic crystal sub-layer 1012 with a photonic band gap at a wavelength band of the light of the third color, and includes the photonic crystals 101 with the photonic band gap at the wavelength band of the blue light, the second photonic crystal sub-layer 12 of the second filter unit 02 is a photonic crystal sub-layer 1032 with a photonic band gap at a wavelength band of the light of the first color, and includes photonic crystals 103 with a photonic band gap at a wavelength band of the red light, so that the photonic crystal layer 121 of the second filter unit 02 is configured to transmit green light. The first photonic crystal sub-layer 11 of the third filter unit 03 is a photonic crystal sub-layer 1033 with the photonic band gap at the wavelength band of the light of the first color, and includes the photonic crystals 103 with the photonic band gap at the wavelength band of the red light, the second photonic crystal sub-layer 12 of the third filter unit 03 is a photonic crystal sub-layer 1023 with the photonic band gap at the wavelength band of the light of the second color, and includes the photonic crystals 102 with the photonic band gap at the wavelength band of the green light, so that the photonic crystal layer 121 of the third filter unit 03 is configured to transmit blue light. For example, the green light reflected by the second photonic crystal sub-layer 12 of the third filter unit 03 can pass through the green light channel to be reused to improve the utilization rate of light.

As illustrated in FIG. 1B, the photonic band gaps of the first photonic crystal sub-layers 11 of the first filter unit 01, the second filter unit 02, and the third filter unit 03 are at wavelength bands of the blue light, the blue light, and the red light, respectively, and the photonic band gaps of the second photonic crystal sub-layers 12 of the first filter unit 01, the second filter unit 02, and the third filter unit 03 are at wavelength bands of the green light, the red light, and the green light, respectively; therefore, the first filter unit 01, the second filter unit 02, and the third filter unit 03 can only transmit red light, green light, and blue light, respectively; thereby forming channels for propagating light waves with wavelengths of red light, green light, and blue light, respectively, and playing a role in selectively propagating a light wave.

The first photonic crystal sub-layer 11 and the second photonic crystal sub-layer 12 in the same filter unit 0123 in FIG. 1B can also be interchanged. An arrangement of sub-pixels is not limited to that illustrated in FIG. 1C.

As illustrated in FIG. 1B, in the color filter substrates 1 provided by some embodiments, the first photonic crystal sub-layers 11 of the first filter unit 01, the second filter unit 02, and the third filter unit 03 are located at the same layer, for example, located at the first layer, which may be referred to as a first layer 1L of photonic crystal. For example, two of the first photonic crystal sub-layers 11 of the first filter unit 01, the second filter unit 02, and the third filter unit 03 are configured to reflect light of the same color. For example, in the same pixel, the first photonic crystal sub-layers 11 configured to reflect light of the same color may or may not be adjacent to each other.

As illustrated in FIG. 1B, in the color filter substrates 1 provided by some embodiments, the second photonic crystal sub-layers 12 of the first filter unit 01, the second filter unit 02, and the third filter unit 03 are located at the same layer, for example, located at the second layer, which may be referred to as a second layer 2L of photonic crystal. For example, two of the second photonic crystal sub-layers 12 of the first filter unit 01, the second filter unit 02, and the third filter unit 03 are configured to reflect light of the same color. For example, in the same pixel, the second photonic crystal sub-layers 12 configured to reflect light of the same color may or may not be adjacent to each other.

As illustrated in FIG. 1B, in some embodiments, in order to further improve a purity of a transmitted light, the filter unit 0123 of the color filter substrate 1 further includes a quantum dot photoluminescence layer 108 on the photonic crystal layer 121. At least one selected from the group consisting of the first filter unit 01, the second filter unit 02, and the third filter unit 03 includes a quantum dot photoluminescence layer 108. For example, at least one of the first filter unit 01 and the second filter unit 02 includes a quantum dot photoluminescence layer 108. The quantum dot photoluminescence layer 108 is configured to be excited to generate light of the same color as the light transmitted by photonic crystal layer 121 in a region where the quantum dot photoluminescence layer 108 is located. The color filter substrate provided by this embodiment can realize a construction of a composite color filter layer including photonic crystals and quantum dots. It should be understood that in the embodiment of the present disclosure, the filter unit 0123 may not include the quantum dot photoluminescence layer 108, but may be consisted of the photonic crystal layer 121.

As illustrated in FIG. 1B, in some embodiments, an orthographic projection of the quantum dot photoluminescence layer 108 on the base substrate 10 is greater than or equal to a light emitting area of the filter unit in a region where the quantum dot photoluminescence layer 108 is located, without limited thereto. For example, a thickness of the quantum dot photoluminescence layer is in a range from 40 nm to 40 μm.

As illustrated in FIG. 1B, in some embodiments, in the case where first filter unit 01 and second filter unit 02 adjacent to each other are provided with a quantum dot photoluminescence layer 108, respectively, side surfaces of quantum dot photoluminescence layers 108 adjacent to each other are connected with each other.

As illustrated in FIG. 1B, in some embodiments, the first filter unit 01 includes a quantum dot photoluminescence layer 1081 configured to be excited to generate red light, and the second filter unit 02 includes a quantum dot photoluminescence layer 1082 configured to be excited to generate green light. As illustrated in FIG. 1B, in the case where an irradiation light 21 is blue light and the third filter unit 03 is a blue light channel, the third filter unit 03 is not provided with a quantum dot photoluminescence layer, so as to save a material of quantum dot. Of course, in the case where the irradiation light adopts light of other colors, a quantum dot photoluminescence layer may also be provided in the third filter unit 03. As illustrated in FIG. 1B, the quantum dot photoluminescence layers 108 in the plurality of filter units 0123 may be referred to as a photoluminescence layer QL of quantum dot.

Red and green excitation light generated by using blue light to excite quantum dot materials can only propagate in the red light channel and the green light channel in the photonic crystal layer, respectively; similarly, blue light can only propagate in the blue light channel, and other stray light cannot propagate in the photonic crystal layer, thus obviously improving a purity of transmitted light.

For example, a material of a quantum dot is a photoluminescent quantum dot material such as CdSe, CdTe, graphene, etc. For example, a range of an emission peak of a blue quantum dot is 440-460 nm; a range of an emission peak of a green quantum dot is 510-540 nm, and a range of an emission peak of a red quantum dot is 630-670 nm. For example, blue quantum dots emit blue light when excited, green quantum dots emit green light when excited, and red quantum dots emit red light when excited.

As illustrated in FIG. 1B, in the color filter substrates 1 provided by some embodiments, the first photonic crystal sub-layer 11 has a side surface of a sawtooth structure, the two first photonic crystal sub-layers 11 of adjacent filter units are meshed with each other through the sawtooth structures; the second photonic crystal sub-layer 12 has a side surface of a sawtooth structure, and the two second photonic crystal sub-layers 12 of adjacent filter units are meshed with each other through the sawtooth structures.

For example, in the embodiment of the present disclosure, a side surface of an element/component having a sawtooth structure may refer to a side surface of the element/component having a sawtooth structure in a cross-sectional view, without limited thereto.

As illustrated in FIG. 1B, in the color filter substrates 1 provided by some embodiments, the second photonic crystal sub-layers 12 in the adjacent filter units (the first filter unit 01 and the second filter unit 02) have side surfaces of sawtooth structures, and the two second photonic crystal sub-layers 12 of the adjacent filter units (the first filter unit 01 and the second filter unit 02) are meshed with each other through the sawtooth structures. In the adjacent filter units (the first filter unit 01 and the second filter unit 02), the first photonic crystal sub-layers 11 configured to reflect light of the same color are adjacent to each other (photonic crystals 101 with a photonic band gap at a wavelength band of blue light). Due to a periodic arrangement characteristic of the photonic crystals, at an intersection of the first filter unit 01 and the second filter unit 02, the adjacent first photonic crystal sub-layers 11 (the photonic crystals 101 with the photonic band gap at the wavelength band of blue light) are equivalent to have side surfaces that are also meshed with each other by sawtooth structures. Therefore, at the intersection of adjacent filter units, a portion where the adjacent first photonic crystal sub-layers 11 are meshed with each other is overlapped with a portion where the adjacent second photonic crystal sub-layers 12 are meshed with each other, so that a stacked portion formed by stacking the photonic crystal sub-layer configured to reflect the light L1 of the first color, the photonic crystal sub-layer configured to reflect the light L2 of the second color, and the photonic crystal sub-layer configured to reflect the light L3 of the third color can be served as a black matrix.

As illustrated in FIG. 1B (also in FIG. 1C), in the color filter substrates 1 provided by some embodiments, the first photonic crystal sub-layers 11 in adjacent filter units (the first filter unit 01 and the third filter unit 03) have side surfaces of sawtooth structures, and the two first photonic crystal sub-layers 11 are meshed with each other through the sawtooth structures. In the adjacent filter units (the first filter unit 01 and the third filter unit 03), the second photonic crystal sub-layers 12 (the photonic crystals 102 with a photonic band gap at a wavelength band of green light) configured to reflect light of the same color are adjacent to each other. Due to a periodic arrangement characteristic of photonic crystals, at an intersection of the first filter unit 01 and the third filter unit 03, the adjacent second photonic crystal sub-layers 12 (the photonic crystals 102 with a photonic band gap at a wavelength band of green light) are equivalent to have side surfaces that are also meshed with each other by sawtooth structures. Therefore, at an intersection of adjacent filter units, a portion where the adjacent first photonic crystal sub-layers 11 are meshed with each other is overlapped with a portion where the adjacent second photonic crystal sub-layers 12 are meshed with each other, so that a stacked portion 123 formed by stacking the photonic crystal sub-layer configured to reflect the light L1 of the first color, the photonic crystal sub-layer configured to reflect the light L2 of the second color, and the photonic crystal sub-layer configured to reflect the light L3 of the third color can be served as a black matrix.

As illustrated in FIG. 1B, two first photonic crystal sub-layers of adjacent filter units with different photonic band gaps have first side surfaces S1 opposite to each other, each first side surface has a sawtooth structure, and the two first photonic crystal sub-layers of the adjacent filter units are meshed with each other through the first side surfaces; two second photonic crystal sub-layers of adjacent filter units with different photonic band gaps have second side surfaces S2 opposite to each other, each second side surface has a sawtooth structure, and the two second photonic crystal sub-layers of the adjacent filter units are meshed with each other through the second side surfaces.

As illustrated in FIG. 1B, in some embodiments, the photonic crystal sub-layer with a photonic band gap at a wavelength band of the light of the first color, the photonic crystal sub-layer with a photonic band gap at a wavelength band of light of the second color, and the photonic crystal sub-layer with a photonic band gap at a wavelength band of light of the third color are overlapped with each other at an intersection of adjacent filter units 0123.

As illustrated in FIG. 1B, in the color filter substrates 1 provided by some embodiments, in the case where the photonic band gaps of the first photonic crystal sub-layers 11 of the adjacent filter units are different and the photonic band gaps of the second photonic crystal sub-layers 12 of the adjacent filter units are different, a width of the stacked portion 123 served as a black matrix at an intersection of the above-mentioned adjacent filter units is greater than or equal to a width of the stacked portion 123 served as a black matrix at an intersection of adjacent filter units in which the first photonic crystal sub-layers 11 having the same photonic band gap or the second photonic crystal sub-layers 12 having the same photonic band gap are located. For example, when the photonic crystal layer is formed by inkjet printing, the width of the stacked portion 123 may be adjusted by adjusting an amount of photonic crystal dispersion liquid of each filter unit.

For example, as illustrated in FIG. 1B, a width d2 of the stacked portion served as a black matrix at an intersection of adjacent filter units in which the first photonic crystal sub-layers 11 having different photonic band gaps and the second photonic crystal sub-layers 12 having different photonic band gaps are located is equal to a width d1 of the stacked portion served as a black matrix at an intersection of adjacent filter units in which the first photonic crystal sub-layers 11 having the same photonic band gap or the second photonic crystal sub-layers 12 having the same photonic band gap are located.

As illustrated in FIG. 1B, in the color filter substrates 1 provided by some embodiments, the first filter unit 01 and the second filter unit 02 are adjacent to each other, at an intersection of the first filter unit 01 and the second filter unit 02, the two first photonic crystal sub-layers 11 that are adjacent to each other and located at the same layer and the second photonic crystal sub-layer 12 that is stacked with one of the two first photonic crystal sub-layers 11 have a stacked portion 123 configured to reflect the light L1 of the first color, the light L2 of the second color, and the light L3 of the third color, or the two second photonic crystal sub-layers 12 that are adjacent to each other and located at the same layer and the first photonic crystal sub-layer 11 that is stacked with one of the two second photonic crystal sub-layers 12 have a stacked portion 123 configured to reflect the light L1 of the first color, the light L2 of the second color, and the light L3 of the third color. That is, the photonic crystal sub-layer configured to reflect the light L1 of the first color, the photonic crystal sub-layer configured to reflect the light L2 of the second color, and the photonic crystal sub-layer configured to reflect the light L3 of the third color have a stacked portion. Therefore, the stacked portion can be served as a black matrix without providing a black matrix, thereby remarkably improving a transmittance and a purity of transmitted light.

As illustrated in FIG. 1B, in some embodiments, in the first layer 1L of photonic crystal, adjacent first photonic crystal sub-layers 11 with different photonic band gaps are staggered and stacked with each other at an intersection position. For example, the first photonic crystal sub-layer 11 has a side surface of a sawtooth structure to facilitate matching with the side surface of the adjacent first photonic crystal sub-layer 11 of a sawtooth structure, so that the adjacent first photonic crystal sub-layers 11 with different photonic band gaps are staggered with each other at an intersection position. In a direction perpendicular to the base substrate 10, the staggered portion is overlapped with the second photonic crystal sub-layer 12, thereby forming a stacked portion of the photonic crystal sub-layers that reflects the light L1 of the first color, the light L2 of the second color, and the light L3 of the third color, respectively.

For example, as illustrated in FIG. 1B, in the first layer 1L of photonic crystal of the second filter unit 02 and third filter unit 03 that are adjacent to each other, the photonic crystal sub-layer 1012 with a photonic band gap at a wavelength band of the light of the third color has a side surface of a sawtooth structure, the photonic crystal sub-layer 1033 with a photonic band gap at a wavelength band of the light of the first color has a side surface of a sawtooth structure, the two sawtooth structures are meshed with each other to form a staggered portion, and the staggered portion is overlapped with the photonic crystal sub-layer 1023 with a photonic band gap at a wavelength band of the light of the second color in a direction perpendicular to the base substrate to form a stacked portion playing a role of a black matrix.

As illustrated in FIG. 1B, in some embodiments, in the second layer 2L of photonic crystal, adjacent second photonic crystal sub-layers 12 having different photonic band gaps are staggered with each other at an intersection of adjacent filter units. For example, the second photonic crystal sub-layer 12 has a side surface of a sawtooth structure to facilitate matching with a side surface of a sawtooth structure at an edge of the second photonic crystal sub-layer 12 adjacent thereof so that the second photonic crystal sub-layers 12 with different photonic band gaps are staggered with each other at an intersection of adjacent filter units. In a direction perpendicular to the base substrate 10, the staggered portion is overlapped with the first photonic crystal sub-layer 11, thereby forming a stacked portion of the photonic crystal sub-layers that reflects the light L1 of the first color, the light L2 of the second color, and the light L3 of the third color, respectively.

For example, as illustrated in FIG. 1B, in the second layer 2L of photonic crystal of the first filter unit 01 and second filter unit 02 that are adjacent to each other, the photonic crystal sub-layer 1021 with a photonic band gap at a wavelength band of the light of the second color has a side surface of a sawtooth structure, the photonic crystal sub-layer 1032 with a photonic band gap at a wavelength band of the light of the first color has a side surface of a sawtooth structure, and the two sawtooth structures are meshed with each other to form a staggered portion. The staggered portion is overlapped with the photonic crystal sub-layer 1011 or 1012 of the first layer 1L of photonic crystal with a photonic band gap at a wavelength band of the light of the third color to form a stacked portion served as a black matrix.

In the color filter substrates provided by some embodiments, a thickness of at least one of the first photonic crystal sub-layer 11 and the second photonic crystal sub-layer 12 is in a range from 400 nm to 80 μm in order to facilitate the formation of a periodic structure in which materials with high and low refractive indexes are alternately arranged. For further example, the thickness of the first photonic crystal sub-layer 11 and/or the thickness of the second photonic crystal sub-layer 12 is in a range from 800 nm to 30 μm.

Figure 1C:
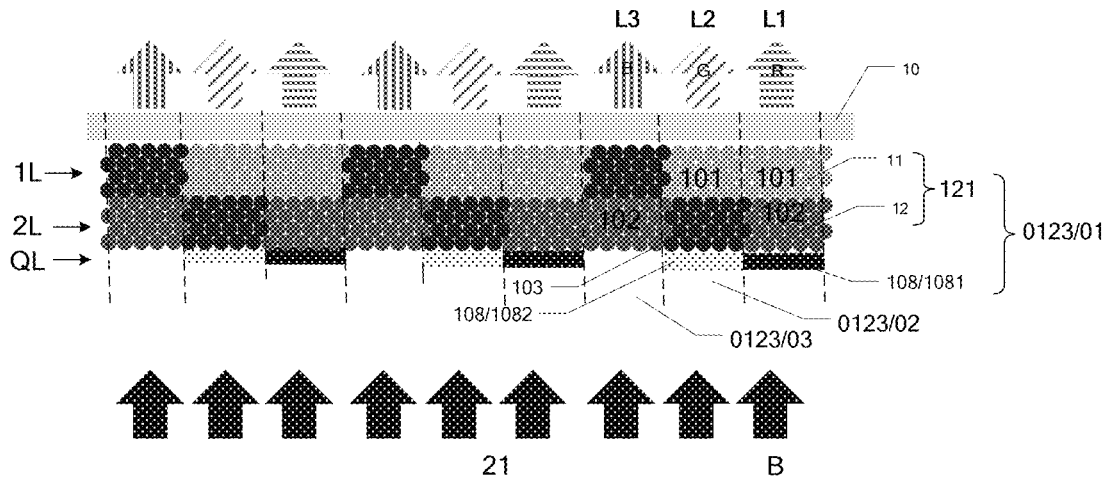
FIG. 1C is a cross-sectional view illustrating a color filter substrate provided by another embodiment of the present disclosure.

FIG. 1C is a cross-sectional view illustrating a color filter substrate provided by another embodiment of the present disclosure. A cross-sectional view illustrating a color filter substrate including a plurality of pixels PL is illustrated in FIG. 1C.

Figure 2A:
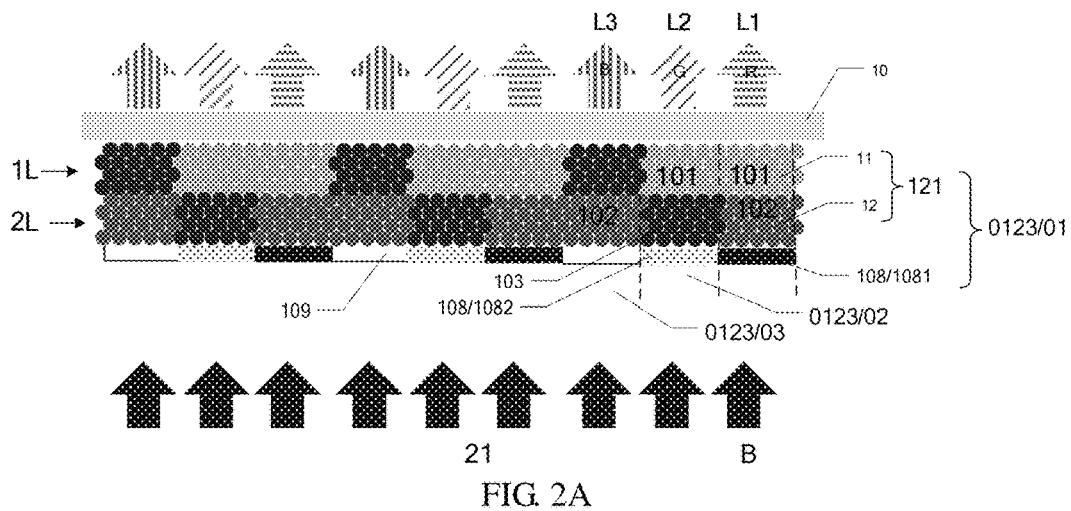
FIG. 2A is a cross-sectional view illustrating a color filter substrate provided by another embodiment of the present disclosure.

FIG. 2A is a cross-sectional view illustrating a color filter substrate provided by another embodiment of the present disclosure. As illustrated in FIG. 2A, in some embodiments, in order to flatten a surface of the color filter substrate, a filling layer 109 may be provided on the third filter unit 03 and between the quantum dot photoluminescence layer 1081 and the quantum dot photoluminescence layer 1082 to fill a gap therebetween. The filling layer 109 may be a transparent resin layer. For example, a surface of the filling layer 109 facing away from the base substrate is located in the same plane as a surface of the quantum dot photoluminescence layers 1081 and/or 1082 facing away from the base substrate.

Figure 2B:
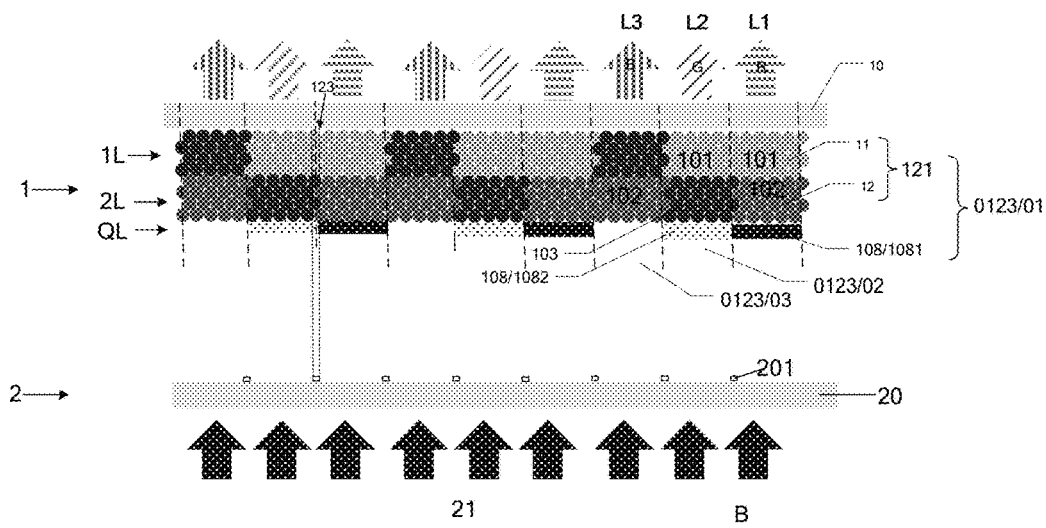
FIG. 2B is a cross-sectional view illustrating a color filter substrate provided by another embodiment of the present disclosure.

FIG. 2B is a cross-sectional view illustrating a color filter substrate provided by another embodiment of the present disclosure. As illustrated in FIG. 2B, in some embodiments, the stacked portion 123 of photonic crystal sub-layer configured to reflect the light L1 of the first color, the light L2 of the second color, and the light L3 of the third color at an intersection of adjacent filter units corresponds to a light shielding portion 201 of an array substrate 2, so as to improve display effect. For example, the array substrate 2 is disposed opposite to the color filter substrate 1, and the light shielding portion 201 is located on a second base substrate 20. The light shielding portion 201 of the array substrate 2 includes, for example, at least one selected from the group consisting of a thin film transistor (TFT), a gate line, and a data line. For example, in a liquid crystal display device, a pixel electrode is not provided at the light shielding portion 201, and liquid crystal molecules at the position may be disordered under an action of an electric field generated by the pixel electrode and a common electrode, and the display effect can be improved by shielding with the stacked portion 123.

Figure 3:
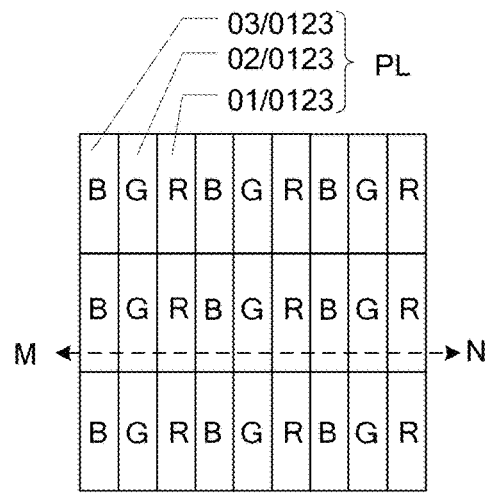
FIG. 3 is a plan view illustrating a filter unit in a color filter substrate provided by an embodiment of the present disclosure.

FIG. 3 is a plan view illustrating a filter unit in a color filter substrates provided by some embodiments of the present disclosure. FIG. 1C may be a cross-sectional view of FIG. 3 taken along line M-N. The plan view illustrating the filter unit provided by the embodiment of the present disclosure is not limited to that illustrated in FIG. 3. For example, the sub-pixels may be arranged in other ways. For example, sub-pixels of other colors may also be included.

In the color filter substrates 1 provided by some embodiments, the photonic crystals in the first photonic crystal sub-layer 11 and the photonic crystals in the second photonic crystal sub-layer 12 include nanosphere photonic crystals, and a refractive index of the nanosphere photonic crystals is greater than 2. Using high refractive index nanospheres as materials for constructing photonic crystals can avoid a difference in different viewing angles when observing the photonic crystals and increase the viewing angle.

For example, a material of the photonic crystals is monodisperse colloidal microspheres with high refractive index, such as cadmium sulfide, cuprous oxide, titanium oxide, zinc oxide, zinc sulfide, etc. with a refractive index greater than 2.

Figure 4:
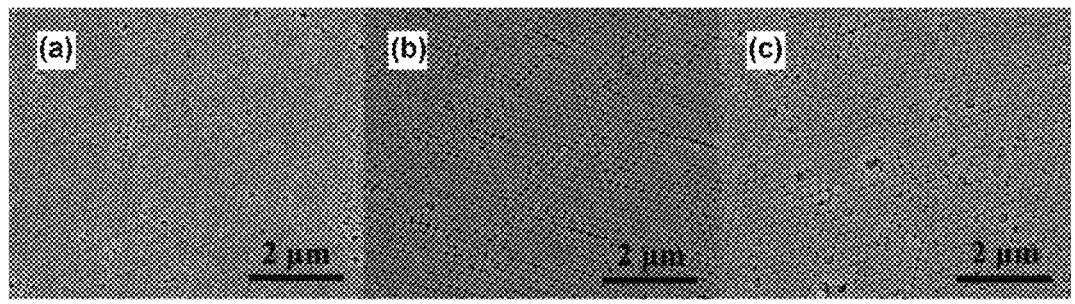
FIG. 4 is a scanning electron microscope image illustrating cuprous oxide nanospheres with photonic band gaps at wavelength bands of blue light, green light and red light, respectively used in a color filter substrate provided by an embodiment of the present disclosure.

FIG. 4 illustrates a scanning electron microscope image of cuprous oxide nanospheres with photonic band gaps at a wavelength band of blue, green and red light, respectively, which are used in the color filter substrate provided by an embodiment of the present disclosure. As illustrated in FIG. 4, the photonic band gaps of the cuprous oxide nanospheres in (a), (b) and (c) in FIG. 4 are at a wavelength band of blue, green and red light, respectively.

The design of photonic crystals is as follows: a basic principle of color generation of the photonic crystals can be explained by Bragg diffraction, and a position of theoretical reflection peak of photonic crystals can be calculated according to Bragg diffraction basic formulas:

$$\lambda_{Bragg}=2d\sqrt{n_{eff}^2-\sin^2\theta} \quad \text{first formula}$$

$$n_{eff}^2=n_{sphere}^2 f_{sphere}+n_{air}^2 f_{air} \quad \text{second formula}$$

$$d=2\sqrt{2/3}D \quad \text{third formula}$$

Among them, $n_{eff}$ is an effective refractive index; $n_{sphere}$ is a refractive index of a material of a photonic crystal; $n_{air}$ is a refractive index of air; $f_{sphere}$ and fair are a volume percentage of spherical nano materials in the photonic crystals and a volume percentage of air in photonic crystals, respectively; θ is an incident angle of light; and D is a diameter of a microsphere.

If the effective refractive index of the photonic crystal is large enough, the influence of the incident angle of light on the diffraction peak of the photonic crystal can be approximately ignored, so a high refractive index material with a refractive index greater than 2 can be adopted. The embodiment is described with reference to the case where cadmium sulfide (with a refractive index of 2.51) nano microspheres are taken as a material for constructing the photonic crystal, by way of example, a size of the microsphere of the photonic crystal with photonic band gaps at a wavelength band of red light, green light and blue light are 190-210 nm, 160-180 nm and 130-150 nm, respectively; and corresponding reflection peaks are located at 610-680 nm (wavelength band of red light), 520-580 nm (wavelength band of green light) and 420-485 nm (wavelength band of blue light), respectively.

Figure 5:
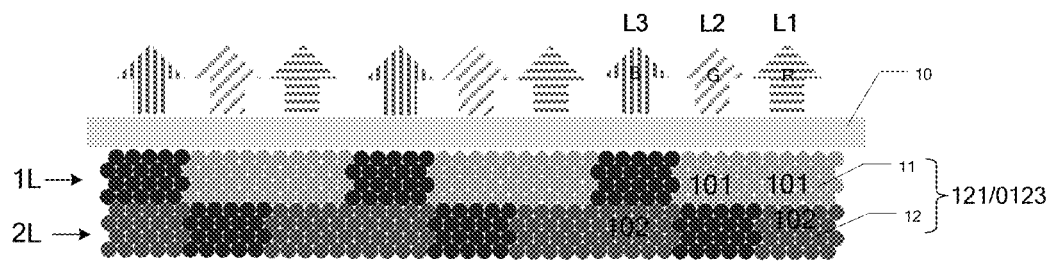
FIG. 5 is a cross-sectional view illustrating a color filter substrate provided by another embodiment of the present disclosure.

FIG. 5 is a cross-sectional view illustrating a color filter substrate provided by another embodiment of the present disclosure. As illustrated in FIG. 5, a quantum dot photoluminescence layer may not be provided on the photonic crystal layer 121.

Figure 6:
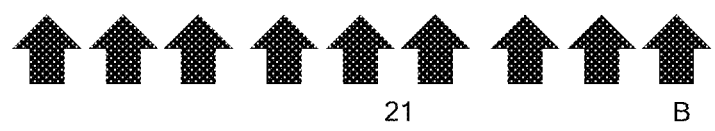
FIG. 6 is a diagram illustrating different arrangements of a photonic crystal layer and a quantum dot luminescent layer in a color filter substrate provided by another embodiment of the present disclosure.

FIG. 6 illustrates a diagram of structures of color filter substrates provided by some embodiments of the present disclosure. Different color filter substrates are formed by adjusting the first layer 1L of photonic crystal, the second layer 2L of photonic crystal, and the photoluminescence layer QL of quantum dot. For example, a structure of a in FIG. 6 may correspond to the color filter substrate illustrated in FIG. 1C. A structure of c in FIG. 6 may correspond to a structure of a color filter substrate after the first layer 1L of photonic crystal and the second layer 2L of photonic crystal of the color filter substrate illustrated in FIG. 1C are interchanged. It should be understood that the photoluminescence layer QL of quantum dot may not be provided in the layer structure of the color filter substrate illustrated in FIG. 6. In FIG. 6, R, G and B in the photoluminescence layer QL of quantum dot represent that the photoluminescence layer of quantum dot in the filter unit is excited to generate red light, green light and blue light, respectively.

At least one embodiment of the present disclosure provides a manufacturing method of a color filter substrate 1, including: forming a first photonic crystal sub-layer 11 on a base substrate 10; and forming a second photonic crystal sub-layer 12 on the base substrate 10; the first photonic crystal sub-layer 11 and the second photonic crystal sub-layer 12 are arranged in a stacked manner, the first photonic crystal sub-layer 11 and the second photonic crystal sub-layer 12 constitute a photonic crystal layer 121 configured to transmit light of one color. For example, the photonic crystal layer 121 is configured to transmit one selected from the group consisting of the light L1 of the first color, the light L2 of the second color, and the light L3 of the third color, and is configured to reflect the other two of the light L1 of the first color, the light L2 of the second color, and the light L3 of the third color. For example, the first photonic crystal sub-layer 11 is configured to reflect one selected from two of the light L1 of the first color, the light L2 of the second color, and the light L3 of the third color that are different from the light transmitted by the photonic crystal layer 121, and the second photonic crystal sub-layer 12 is configured to reflect the other selected from the two of the light L1 of the first color, the light L2 of the second color, and the light L3 of the third color that are different from the light transmitted by the photonic crystal layer 121. For example, a photonic band gap of the first photonic crystal sub-layer 11 is different from that of the second photonic crystal sub-layer 12 to reflect light of different colors, respectively.

Some embodiments provide manufacturing methods in which the first photonic crystal sub-layer 11 and the second photonic crystal sub-layer 12 are formed using an inkjet printing process. An inkjet printing, which has lower process difficulty and is easy to be industrialized, can be used to realize rapid and large-area construction of photonic crystal optical channels.

In the manufacturing methods provided by some embodiments, the inkjet printing process includes forming a photonic crystal dispersion liquid, forming a pattern of photonic crystal dispersion liquid by inkjet printing using the photonic crystal dispersion liquid, and performing a heat treatment on the pattern of photonic crystal dispersion liquid to remove a substance to be removed to form a photonic crystal pattern; the photonic crystal pattern includes a first photonic crystal sub-layer 11 or a second photonic crystal sub-layer 12.

For example, a material of nano photonic crystals can be made by hydrothermal method, sol-gel method, emulsion polymerization and other methods.

For example, the photonic crystal dispersion liquid can be made by the following method. The monodisperse colloidal microspheres can be obtained by dispersing nano microspheres with a high refractive index in a dispersion liquid and ultrasonically dispersing. For example, the dispersion liquid includes deionized water, and at least one selected from the group consisting of a high boiling point additive, ethanol, glycerin, surfactant, defoaming agent, adhesive, and pH regulator. Photonic crystal nanospheres can be dispersed in various ways as long as a well-dispersed photonic crystal dispersion liquid can be obtained.

In some embodiments, the high boiling point additive is selected from at least one selected from the group consisting of ethylene glycol, diethylene glycol and formamide, the surfactant is selected from OP-10 or polyvinylpyrrolidone, the defoaming agent is selected from tributyl phosphate, the adhesive is selected from at least one selected from the group consisting of polyvinyl alcohol, polyurethane resin and acrylic resin, the pH regulator includes ethanolamine, and the triethanolamine includes at least one of triethanolamine and diethanolamine.

Some embodiments provide manufacturing methods where a temperature of the heat treatment is 100-120° C. For further example, the temperature of the heat treatment is 105-115° C. The temperature of the heat treatment can be selected according to the substance to be removed. The temperature of the heat treatment given above takes into account a property of the substance to be removed and an efficiency of the heat treatment, and is beneficial to the process of the heat treatment and the improvement of the efficiency.

Some embodiments provide manufacturing methods in which a heating time of the heat treatment is 20-30 s. The heating time of the heat treatment given by the embodiments of the present disclosure is short, a substance to be removed in the pattern of photonic crystal dispersion liquid can be quickly removed, air gaps can be formed between photonic crystals with high refractive indexes, and a periodic structure in which materials with high refractive index and low refractive index are alternately arranged can be formed.

In the manufacturing method provided by some embodiments, forming the first photonic crystal sub-layer 11 includes forming the first photonic crystal sub-layers 11 of the first filter unit 01, the second filter unit 02, and the third filter unit 03, respectively; and forming the second photonic crystal sub-layer 12 includes forming the second photonic crystal sub-layers 12 of the first filter unit 01, the second filter unit 02, and the third filter unit 03, respectively. Two of the first photonic crystal sub-layers 11 of the first filter unit 01, the second filter unit 02, and the third filter unit 03 are configured to reflect light of the same color and are formed by the same inkjet process. Two of the second photonic crystal sub-layers 12 of the first filter unit 01, the second filter unit 02, and the third filter unit 03 are configured to reflect light of the same color and are formed by the same inkjet process. The photonic crystal layer 121 of the first filter unit 01 is configured to transmit light L1 of the first color, the photonic crystal layer 121 of the second filter unit 02 is configured to transmit light L2 of the second color, and the photonic crystal layer 121 of the third filter unit 03 is configured to transmit light L3 of the third color.

In the embodiment of the present disclosure, the photonic crystal layer 121 can be formed by printing three kinds of monodisperse colloidal microspheres of R, G and B by an inkjet printing process. In the case where the color filter substrate includes a quantum dot electroluminescence layer, the quantum dot electroluminescence layer can be formed by an inkjet printing process. For example, the quantum dot electroluminescence layer of red light and the quantum dot electroluminescence layer of green light are sequentially printed by inkjet printing processes to form a luminescence layer QL of quantum dot.

FIG. 7A to FIG. 7H illustrate a manufacturing method of a color filter substrate provided by an embodiment of the present disclosure. The manufactured color filter substrate can be illustrated in FIG. 1C. The manufacturing method includes the following steps.

Figure 7A:
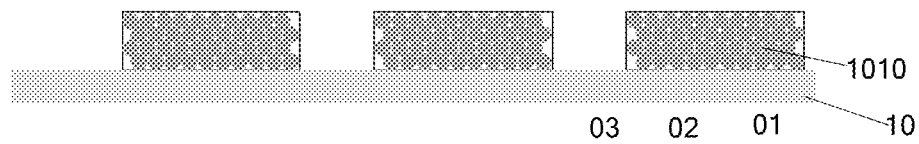
FIG. 7A to FIG. 7H illustrate a manufacturing method of a color filter substrate provided by an embodiment of the present disclosure.

Step (1), forming a first photonic crystal dispersion liquid, as illustrated in FIG. 7A, forming a pattern 1010 of first photonic crystal dispersion liquid by inkjet printing using the first photonic crystal dispersion liquid.

Figure 7B:
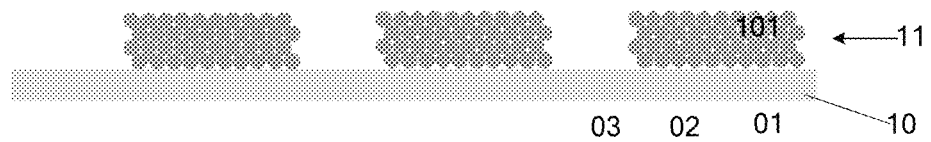

Step (2), performing a heat treatment on the pattern 1010 of first photonic crystal dispersion liquid to remove a substance to be removed including a solvent, as illustrated in FIG. 7B, forming photonic crystals of the first filter unit 01 and the second filter unit 02 with a photonic band gap at a wavelength band of blue light.

Figure 7C:
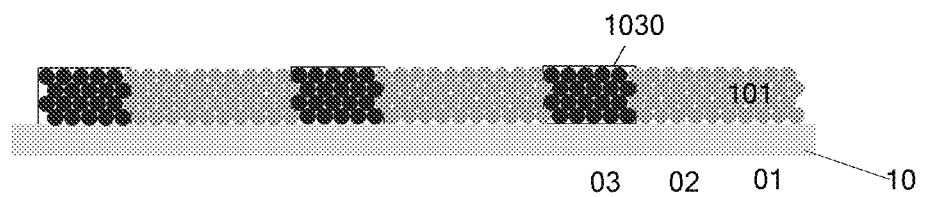

Step (3), forming a second photonic crystal dispersion liquid, as illustrated in FIG. 7C, forming a pattern 1030 of second photonic crystal dispersion liquid by inkjet printing using the second photonic crystal dispersion liquid.

Figure 7D:
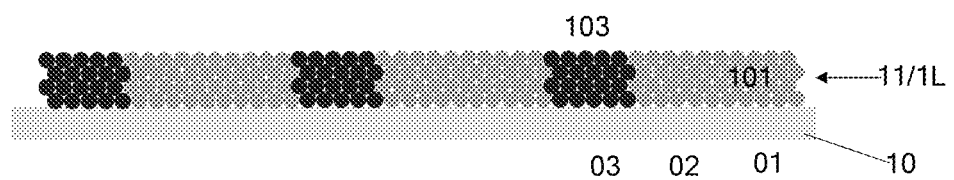

Step (4), performing a heat treatment on the pattern 1030 of second photonic crystal dispersion liquid to remove a substance to be removed including a solvent, as illustrated in FIG. 7D, forming photonic crystals of the third filter unit 03 with a photonic band gap at a wavelength band of red light. Thus, a first layer 1L of photonic crystal is formed. The first layer 1L of photonic crystal of each filter unit is the first photonic crystal sub-layer 11.

Figure 7E:
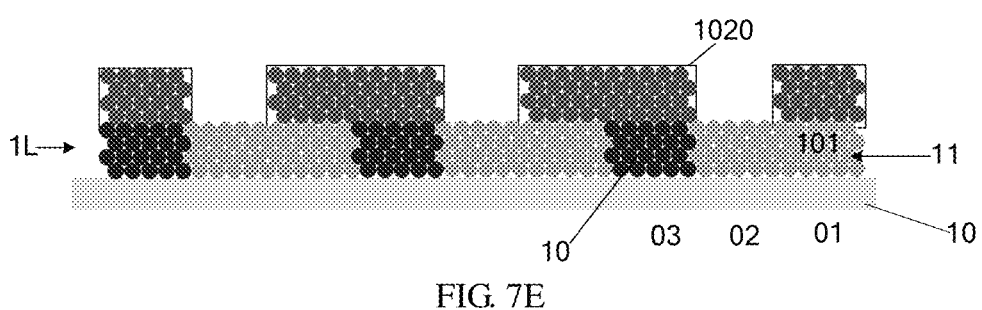

Step (5), forming a third photonic crystal dispersion liquid, as illustrated in FIG. 7E, forming a pattern 1020 of third photonic crystal dispersion liquid on the first layer 1L of photonic crystal by inkjet printing using the third photonic crystal dispersion liquid.

Figure 7F:
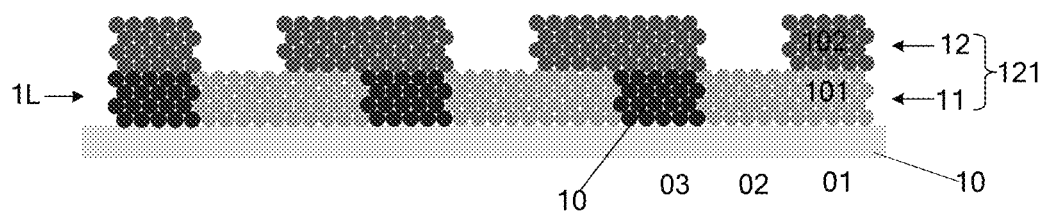

Step (6), performing a heat treatment on the pattern 1020 of third photonic crystal dispersion liquid to remove a substance to be removed including a solvent; as illustrated in FIG. 7F, forming photonic crystals of the first filter unit 01 and the third filter unit 03 with a photonic band gap at a wavelength band of green light.

Figure 7G:
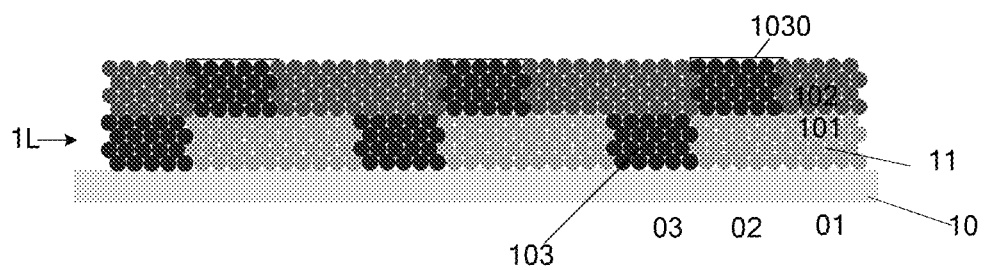

Step (7), forming a second photonic crystal dispersion liquid, as illustrated in FIG. 7G, forming a pattern 1030 of second photonic crystal dispersion liquid by inkjet printing using the second photonic crystal dispersion liquid.

Figure 7H:
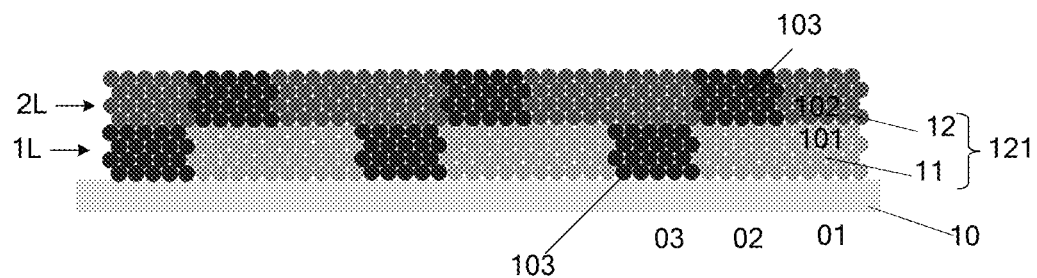

Step (8), performing a heat treatment on the pattern 1030 of the second photonic crystal dispersion liquid to remove a substance to be removed including a solvent, as illustrated in FIG. 7H, forming photonic crystals of the second filter unit 02 with a photonic band gap at a wavelength band of red light. Thus, a second layer 2L of photonic crystal is formed. The second layer 2L of photonic crystal of each filter unit is the second photonic crystal sub-layer 12.

As illustrated in FIG. 7B, after the substance to be removed is removed, a photonic crystal structure in which materials of nano microsphere photonic crystals with a high refractive index and air with a low refractive index periodically arranged is formed. As illustrated in FIG. 7B, the photonic crystal sub-layer 1011 (the first photonic crystal sub-layer 11) with a photonic band gap at a wavelength band of the light of the third color has a side surface of a sawtooth structure.

As illustrated in FIG. 7D, the photonic crystal sub-layer 1033 (the first photonic crystal sub-layer 11) with a photonic band gap at a wavelength band of the light of the first color has a side surface of a sawtooth structure. First photonic crystal sub-layers 11 adjacent to each other are stacked at an intersection thereof.

For example, in some embodiments, the method includes forming the first layer 1L of photonic crystal firstly, and then forming the second layer 2L of photonic crystal. Forming the first layer 1L of photonic crystal includes sequentially forming two photonic crystal sub-layers with photonic band gaps at wavelength bands of light of different colors. Forming the second layer 2L of photonic crystal includes sequentially forming two photonic crystal sub-layers with photonic band gaps at wavelength bands of light of different colors.

In the embodiment of the present disclosure, nano microspheres of a high refractive index are printed by an inkjet process to construct a photonic crystal optical channel with selective transmission of a light wave of a certain frequency, and only two layers of three-dimensional photonic crystals need to be printed to realize the construction of the optical channel, so that the manufacturing process is simplified and is easy to be industrialized.

The color filter substrate in any one of a-h in FIG. 6 can be formed by a similar method.

Of course, in the embodiment of the present disclosure, it is also possible to use two different photonic crystal dispersion liquids for inkjet printing to form two patterns of photonic crystal dispersion liquid simultaneously when making each layer of photonic crystal, and then performing a heat treatment on the two patterns of photonic crystal dispersion liquids to remove a substance to be removed to form two patterns of photonic crystals, i.e. to form the layer of photonic crystal.

For example, the first layer 1L of photonic crystal is manufactured by forming a pattern 1010 of the first photonic crystal dispersion liquid by inkjet printing using the first photonic crystal dispersion liquid in the first filter unit 01 and the second filter unit 02, forming a pattern 1030 of the second photonic crystal dispersion liquid by inkjet printing using the second photonic crystal dispersion liquid in the third filter unit 03, and then performing a heat treatment to remove a substance to be removed including a solvent to obtain the first layer 1L of photonic crystal.

For example, the second layer 2L of photonic crystal is manufactured by forming a pattern 1020 of the third photonic crystal dispersion liquid by inkjet printing using the third photonic crystal dispersion liquid in the first filter unit 01 and the third filter unit 03, forming a pattern 1030 of second photonic crystal dispersion liquid by inkjet printing using the second photonic crystal dispersion liquid in the second filter unit 02, and then performing a heat treatment to remove a substance to be removed including a solvent to obtain the second layer 2L of photonic crystal.

In the embodiment of the present disclosure, the light of the first color, the light of the second color, and the light of the third color are not limited to red light, green light, and blue light (RGB). For example, the light of the first color, the light of the second color, and the light of the third color may also be light of other colors. For example, other colors include cyan, magenta, yellow (CMY). For example, the color filter substrate provided by the embodiment of the present disclosure may further include a filter unit that is configured to transmit light other than the light of the first color, the light of the second color, and the light of the third color.

At least one embodiment of the present disclosure provides a display device including the color filter substrate 1 provided in any of the above embodiments.

For example, the display device may be a display device such as a liquid crystal display, electronic paper, Organic Light-Emitting Diode (OLED) display, and any product or component having a display function including a television, a digital camera, a mobile phone, a watch, a tablet computer, a notebook computer, a navigator, and the like.

It should be explained that, for the purpose of clarity only, in accompanying drawings for illustrating the embodiment(s) of the present disclosure, a layer or an area may be enlarged. It should be understood that, in the case in which a component such as a layer, a film, an area, a substrate or the like is referred to be "on" or "under" another component, it may be directly on or under the another component or a component is interposed therebetween.

The features of the same embodiment and different embodiments of the present disclosure may be combined with each other without conflict.

The above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A color filter substrate, comprising:
   a base substrate, and
   a plurality of filter units located on the base substrate, each of the plurality of filter units comprising a photonic crystal layer configured to transmit light of one color and comprising a first photonic crystal sub-layer and a second photonic crystal sub-layer that are stacked in a direction perpendicular to the base substrate,
   wherein the plurality of filter units comprise a first filter unit, a second filter unit, and a third filter unit,
   the photonic crystal layer of the first filter unit is configured to transmit light of a first color, the photonic crystal layer of the second filter unit is configured to transmit light of a second color, and the photonic crystal layer of the third filter unit is configured to transmit light of a third color;
   the first photonic crystal sub-layer and the second photonic crystal sub-layer of the first filter unit are a photonic crystal sub-layer with a photonic band gap at a wavelength band of the light of the third color and a photonic crystal sub-layer with a photonic band gap at a wavelength band of the light of the second color, respectively; the first photonic crystal sub-layer and the second photonic crystal sub-layer of the second filter unit are a photonic crystal sub-layer with a photonic band gap at the wavelength band of the light of the third color and a photonic crystal sub-layer with a photonic band gap at a wavelength band of the light of the first color, respectively; and the first photonic crystal sub-layer and the second photonic crystal sub-layer of the third filter unit are a photonic crystal sub-layer with the photonic band gap at the wavelength band of the light of the first color and the photonic band gap at the wavelength band of the light of the second color, respectively,
   wherein at least one selected from the group consisting of the first filter unit, the second filter unit, and the third filter unit further comprises a quantum dot photoluminescence layer located on the photonic crystal layer, the quantum dot photoluminescence layer is configured to be excited to generate light of the same color as light transmitted by the photonic crystal layer located in a region where the quantum dot photoluminescence layer is located,
   wherein a color of one selected from the group consisting of the light of the first color, the light of the second color, and the light of the third color is the same as a color of irradiation light irradiated to the color filter substrate.

2. The color filter substrate according to claim 1, wherein the photonic crystal layer is consisted of the first photonic crystal sub-layer and the second photonic crystal sub-layer.

3. A color filter substrate, comprising:
   a base substrate, and
   a plurality of filter units located on the base substrate, each of the plurality of filter units comprising a photonic crystal layer configured to transmit light of one color and comprising a first photonic crystal sub-layer and a second photonic crystal sub-layer that are stacked in a direction perpendicular to the base substrate, wherein the plurality of filter units comprise a first filter unit, a second filter unit, and a third filter unit, the photonic crystal layer of the first filter unit is configured to transmit light of a first color, the photonic crystal layer of the second filter unit is configured to transmit light of a second color, and the photonic crystal layer of the third filter unit is configured to transmit light of a third color;

the first photonic crystal sub-layer and the second photonic crystal sub-layer of the first filter unit are a photonic crystal sub-layer with a photonic band gap at a wavelength band of the light of the third color and a photonic crystal sub-layer with a photonic band gap at a wavelength band of the light of the second color, respectively; the first photonic crystal sub-layer and the second photonic crystal sub-layer of the second filter unit are a photonic crystal sub-layer with a photonic band gap at the wavelength band of the light of the third color and a photonic crystal sub-layer with a photonic band gap at a wavelength band of the light of the first color, respectively; and the first photonic crystal sub-layer and the second photonic crystal sub-layer of the third filter unit are a photonic crystal sub-layer with the photonic band gap at the wavelength band of the light of the first color and the photonic band gap at the wavelength band of the light of the second color, respectively, wherein two first photonic crystal sub-layers of adjacent filter units with different photonic band gaps have first side surfaces opposite to each other, each of the first side surfaces has a sawtooth structure, and the two first photonic crystal sub-layers of the adjacent filter units are meshed with each other through the first side surfaces; two second photonic crystal sub-layers of adjacent filter units with different photonic band gaps have second side surfaces opposite to each other, each of the second side surfaces has a sawtooth structure, and the two second photonic crystal sub-layers of the adjacent filter units are meshed with each other through the second side surfaces, and wherein at an intersection of adjacent filter units, the sawtooth structure of the first side surface of each of the two first photonic crystal sub-layers is overlapped with the sawtooth structure of the second side surface of each of the two second photonic crystal sub-layers so that a stacked portion configured to reflect the light of the first color, the light of the second color, and the light of the third color so as to be served as a black matrix is provided.

4. The color filter substrate according to claim 1, wherein the light of the first color, the light of the second color, and the light of the third color constitute three primary colors.

5. The color filter substrate according to claim 1, wherein two of the first photonic crystal sub-layer of the first filter unit, the first photonic crystal sub-layer of the second filter unit, and the first photonic crystal sub-layer of the third filter unit are configured to reflect light of a same color; and the first photonic crystal sub-layer of the first filter unit, the first photonic crystal sub-layer of the second filter unit, and the first photonic crystal sub-layer of the third filter unit are located at a same layer;

two of the second photonic crystal sub-layer of the first filter unit, the second photonic crystal sub-layer of the second filter unit, and the second photonic crystal sub-layer of the third filter unit are configured to reflect light of a same color; and the second photonic crystal sub-layer of the first filter unit, the second photonic crystal sub-layer of the second filter unit, and the second photonic crystal sub-layer of the third filter unit are located at a same layer.

6. The color filter substrate according to claim 1, wherein two first photonic crystal sub-layers of adjacent filter units with different photonic band gaps have first side surfaces opposite to each other, each of the first side surfaces has a sawtooth structure, and the two first photonic crystal sub-layers of the adjacent filter units are meshed with each other through the first side surfaces; two second photonic crystal sub-layers of adjacent filter units with different photonic band gaps have second side surfaces opposite to each other, each of the second side surfaces has a sawtooth structure, and the two second photonic crystal sub-layers of the adjacent filter units are meshed with each other through the second side surfaces.

7. The color filter substrate according to claim 1, wherein the photonic crystal sub-layer with the photonic band gap at the wavelength band of the light of the first color, the photonic crystal sub-layer with the photonic band gap at the wavelength band of the light of the second color, and the photonic crystal sub-layer with the photonic band gap at the wavelength band of the light of the third color are overlapped with each other at an intersection of adjacent filter units.

8. The color filter substrate according to claim 3, wherein at least one selected from the group consisting of the first filter unit, the second filter unit, and the third filter unit further comprises a quantum dot photoluminescence layer located on the photonic crystal layer, the quantum dot photoluminescence layer is configured to be excited to generate light of the same color as light transmitted by the photonic crystal layer located in a region where the quantum dot photoluminescence layer is located, wherein an orthographic projection of the quantum dot photoluminescence layer on the base substrate is overlapped with an orthographic projection of the stacked portion on the base substrate.

9. The color filter substrate according to claim 1, wherein a photonic band gap of the first photonic crystal sub-layer is different from that of the second photonic crystal sub-layer.

10. The color filter substrate according to claim 1, wherein a photonic crystal in the first photonic crystal sub-layer and a photonic crystal in the second photonic crystal sub-layer comprise a nanosphere photonic crystal, and a refractive index of the nanosphere photonic crystal is greater than 2.

11. The color filter substrate according to claim 1, wherein a thickness of at least one of the first photonic crystal sub-layer and the second photonic crystal sub-layer is in a range from 400 nm to 80 μm.

12. A display device comprising the color filter substrate according to claim 1.

13. A manufacturing method of a color filter substrate, comprising:

forming a first photonic crystal sub-layer and a second photonic crystal sub-layer on a base substrate, wherein the first photonic crystal sub-layer and the second photonic crystal sub-layer are arranged in a stacked manner and constitute a photonic crystal layer configured to transmit light of one color, the manufacturing method further comprises forming a plurality of filter units, each of the plurality of filter units comprising the photonic crystal layer, the plurality of filter units comprising a first filter unit, a second filter unit, and a third filter unit, the photonic crystal layer of the first filter unit is configured to transmit light of a first color, the photonic crystal layer of the second filter unit is configured to transmit light of a second color, and the photonic crystal layer of the third filter unit is configured to transmit light of a third color;

the first photonic crystal sub-layer and the second photonic crystal sub-layer of the first filter unit are a photonic crystal sub-layer with a photonic band gap at a wavelength band of the light of the third color and a photonic crystal sub-layer with a photonic band gap at a wavelength band of the light of the second color, respectively; the first photonic crystal sub-layer and the second photonic crystal sub-layer of the second filter unit are a photonic crystal sub-layer with a photonic band gap at the wavelength band of the light of the third color and a photonic crystal sub-layer with a photonic band gap at a wavelength band of the light of the first color, respectively; and the first photonic crystal sub-layer and the second photonic crystal sub-layer of the third filter unit are a photonic crystal sub-layer with the photonic band gap at the wavelength band of the light of the first color and the photonic band gap at the wavelength band of the light of the second color, respectively, wherein two first photonic crystal sub-layers of adjacent filter units with different photonic band gaps have first side surfaces opposite to each other, each of the first side surfaces has a sawtooth structure, and the two first photonic crystal sub-layers of the adjacent filter units are meshed with each other through the first side surfaces; two second photonic crystal sub-layers of adjacent filter units with different photonic band gaps have second side surfaces opposite to each other, each of the second side surfaces has a sawtooth structure, and the two second photonic crystal sub-layers of the adjacent filter units are meshed with each other through the second side surfaces, and wherein at an intersection of adjacent filter units, the sawtooth structure of the first side surface of each of the two first photonic crystal sub-layers is overlapped with the sawtooth structure of the second side surface of each of the two second photonic crystal sub-layers so that a stacked portion configured to reflect the light of the first color, the light of the second color, and the light of the third color so as to be served as a black matrix is provided.

14. The manufacturing method according to claim 13, wherein at least one of the first photonic crystal sub-layer and the second photonic crystal sub-layer is formed by an inkjet printing process, the inkjet printing process comprises:

forming a photonic crystal dispersion liquid, forming a pattern of photonic crystal dispersion liquid by inkjet printing using the photonic crystal dispersion liquid, and performing a heat treatment on the pattern of photonic crystal dispersion liquid to remove a substance to be removed to form the first photonic crystal sub-layer or the second photonic crystal sub-layer.

15. A manufacturing method of a color filter substrate, comprising:

forming a first photonic crystal sub-layer and a second photonic crystal sub-layer on a base substrate, wherein the first photonic crystal sub-layer and the second photonic crystal sub-layer are arranged in a stacked manner and constitute a photonic crystal layer configured to transmit light of one color, wherein at least one of the first photonic crystal sub-layer and the second photonic crystal sub-layer is formed by an inkjet printing process, the inkjet printing process comprises:

forming a photonic crystal dispersion liquid, forming a pattern of photonic crystal dispersion liquid by inkjet printing using the photonic crystal dispersion liquid, and performing a heat treatment on the pattern of photonic crystal dispersion liquid to remove a substance to be removed to form the first photonic crystal sub-layer or the second photonic crystal sub-layer, wherein a temperature of the heat treatment is 100-120° C., and a heating time of the heat treatment is 20-30 s.

16. The manufacturing method according to claim 15, further comprising forming a plurality of filter units, each of the plurality of filter units comprising the photonic crystal layer, the plurality of filter units comprising a first filter unit, a second filter unit, and a third filter unit, wherein forming the photonic crystal layer of the first filter unit, the photonic crystal layer of the second filter unit, and the photonic crystal layer of the third filter unit comprises:

forming a first layer of photonic crystal; and forming a second layer of photonic crystal, wherein forming the first layer of photonic crystal comprises:
forming a pattern of first photonic crystal dispersion liquid in the first filter unit and the second filter unit by inkjet printing using a first photonic crystal dispersion liquid, forming a pattern of second photonic crystal dispersion liquid in the third filter unit by inkjet printing using a second photonic crystal dispersion liquid, and performing the heat treatment to remove a substance to be removed comprising a solvent to obtain the first layer of photonic crystal; and forming the second layer of photonic crystal comprises:
forming a pattern of third photonic crystal dispersion liquid in the first filter unit and the third filter unit by inkjet printing using a third photonic crystal dispersion liquid; forming a pattern of second photonic crystal dispersion liquid in the second filter unit by inkjet printing using the second photonic crystal dispersion liquid, and performing the heat treatment to remove a substance to be removed comprising a solvent to obtain the second layer of photonic crystal.

17. The manufacturing method according to claim 15, further comprising forming a plurality of filter units, each of the plurality of filter units comprising the photonic crystal layer, the plurality of filter units comprising a first filter unit, a second filter unit, and a third filter unit, wherein forming the photonic crystal layer of the first filter unit, the photonic crystal layer of the second filter unit, and the photonic crystal layer of the third filter unit comprises:

forming a first layer of photonic crystal; and forming a second layer of photonic crystal, wherein forming the first layer of photonic crystal comprises:
forming a pattern of first photonic crystal dispersion liquid in the first filter unit and the second filter unit by inkjet printing using a first photonic crystal dispersion liquid, and performing the heat treatment to remove a substance to be removed comprising a solvent; and then forming a pattern of second photonic crystal dispersion liquid in the third filter unit by inkjet printing using a second photonic crystal dispersion liquid, and performing the heat treatment to remove a substance to be removed comprising a solvent to obtain the first layer of photonic crystal; and forming the second layer of photonic crystal comprises:
forming a pattern of third photonic crystal dispersion liquid in the first filter unit and the third filter unit by inkjet printing using a third photonic crystal dispersion liquid, and performing the heat treatment to remove a substance to be removed comprising a solvent; and then forming a pattern of second photonic crystal dispersion liquid in the second filter unit by inkjet printing using the second photonic crystal dispersion liquid, and performing the heat treatment to remove a substance to be removed comprising a solvent to obtain the second layer of photonic crystal.

18. The manufacturing method according to claim 13, further comprising: forming a quantum dot photoluminescence layer on the photonic crystal layer, wherein the quantum dot photoluminescence layer is configured to be excited to generate light of the same color as light transmitted by the photonic crystal layer located in a region where the quantum dot photoluminescence layer is located, wherein an orthographic projection of the quantum dot photoluminescence layer on the base substrate is overlapped with an orthographic projection of the stacked portion on the base substrate.

19. The manufacturing method according to claim 18, further comprising: forming a filling layer on the third filter unit and between adjacent quantum dot photoluminescence portions of the quantum dot photoluminescence layer to fill a gap therebetween, and the filling layer is a transparent layer.

20. The color filter substrate according to claim 8, wherein a filling layer is provided on the third filter unit and between adjacent quantum dot photoluminescence portions of the quantum dot photoluminescence layer to fill a gap therebetween, and the filling layer is a transparent layer.

* * * * *